UNITED STATES PATENT OFFICE 2,109,532

MANUFACTURE OF ASBESTOS-CEMENT SHEETS

Noel Arthur Hill, Camellia, near Sydney, Australia, assignor to James Hardie & Co. Pty. Limited, Sydney, Australia, a corporation of New South Wales, Australia No Drawing. Application June 19, 1937, Serial No. 149,275. In Australia July 7, 1936

5 Claims. (Cl. 92—41)

This invention has reference to improvements in the manufacture of asbestos-cement sheets having a porous character and of comparatively light weight.

It is well known to produce cement articles and structures of a porous character to afford economy in material and a reduction in the weight thereof, and this is usually achieved by mixing with the cement a powdered metal such as aluminium or zinc which, when sufficient water and possibly lime, which acts as a plasticizer, has been added to the cement, serves as a means to generate a gas in the agglomerate. This gas causes the mass to expand in one direction while retained in a mould frame and allows it to set in a porous state.

An object of the present invention is to produce an aerated asbestos cement sheet or the like in laminated form by incorporating in the asbestos cement mixture from which it is to be formed, a metal such as aluminium or zinc, the said mixture being passed through what is known in the trade as a paper making machine, to form the laminated sheet, the said sheet having applied thereto during or after manufacture a suitable substance such as caustic soda to cause aeration of the respective laminations due to chemical reaction within the sheet.

According to one form of the invention, 800 parts of cement and 140 parts of asbestos are thoroughly mixed with one part of aluminium powder, in a suitable mill or mixing apparatus, sufficient water being added to produce a slurry of appropriate consistency.

Other materials such as clay, diatomaceous earth, and the like, may be incorporated in the slurry as desired, to constitute a filler for the asbestos-cement.

The process may also be carried out by taking a predetermined quantity of water, adding thereto from 70 to 90 parts of asbestos by weight, 400 parts of cement and 45 parts of lime and one part of aluminium previously mixed with a small quantity of cement in moist form.

The whole mass is mixed preferably in what is known as a tide mill, or the like, into a slurry which is preferably agitated and is fed to a paper machine wherein the laminated sheets are formed in cylindrical shape, it being afterwards slit and laid flat.

To stimulate the generation of gas for the purpose of imparting the desired degree of porosity to the product, a solution of caustic soda or other suitable reagent, capable of reacting with the powdered aluminium in the cement mixture, is applied to the asbestos cement sheet preferably after the rolling operation above has been completed in the paper machine.

The invention also contemplates the addition to the mixture of which the sheets are formed, or to the caustic soda or its equivalent, of a suitable substance capable of accelerating the generation of gas in the asbestos cement.

The reagent in the form of an alkaline solution such as caustic soda, reacts with the aluminium and expands the asbestos between the laminations due to production of hydrogen. The lime in the sheet acts as a plasticizer or improver of the plastic quality of the sheet and facilitates the expansion of the sheets.

The invention may be applied to the manufacture of thick sheets or blocks for insulating purposes in which case a greater proportion of asbestos is used and considerably less cement; while in some instances, the cement may be negligible. In this form of the invention the lime also may be omitted. A suitable stiffening agent such as glue or starch is preferably added at any stage during manufacture, the sheets or blocks being expanded by the production of gas as before.

I claim:

1. A process for the manufacture of laminated aerated asbestos cement sheets, consisting in forming laminated sheets from a mixture of asbestos, cement and a metal selected from the group consisting of aluminum and zinc and then substantially immediately treating said sheets with a caustic solution which reacts with said metal to produce a gas between the laminations.

2. A process for the manufacture of aerated asbestos cement sheets consisting in forming laminated sheets from a mixture of water, asbestos, cement and aluminum, and then substantially immediately treating said sheets with a caustic solution which reacts with said aluminum to cause aeration between the laminations thereof.

3. A process for the manufacture of aerated asbestos cement sheets consisting in forming laminated sheets from a mixture of water, asbestos, cement and zinc, and then substantially immediately treating said sheets with a caustic solution which reacts with said zinc to cause aeration between the laminations thereof.

4. A process for the manufacture of aerated asbestos cement sheets, consisting in forming a mix of water, asbestos, cement and aluminum, said aluminum being previously mixed with a small quantity of cement in moist form, feeding the mix to a paper machine to form laminated sheets, then substantially immediately treating said sheet with a caustic solution which reacts with said aluminum to cause aeration between the laminations.

5. A process for the manufacture of aerated asbestos cement sheets, consisting in forming a mix of a predetermined quantity of water, 70 to 90 parts by weight of asbestos, 400 parts by weight of cement, sufficient lime to act as a plasticizer and one part by weight of aluminum, said aluminum being previously mixed with a small quantity of cement in moist form, feeding the mix to a paper machine to form laminated sheets, then substantially immediately treating said sheet with caustic soda which reacts with said aluminum to cause aeration between the laminations.

NOEL ARTHUR HILL.